(12) United States Patent
Boettcher et al.

(10) Patent No.: US 11,609,863 B2
(45) Date of Patent: Mar. 21, 2023

(54) CAPABILITY WRITE ADDRESS TRACKING

(71) Applicant: Arm Limited, Cambridge (GB)

(72) Inventors: Matthias Lothar Boettcher, Cambridge (GB); François Christopher Jacques Botman, Cambridge (GB)

(73) Assignee: Arm Limited, Cambridge (GB)

( * ) Notice: Subject to any disclaimer, the term of this patent is extended or adjusted under 35 U.S.C. 154(b) by 6 days.

(21) Appl. No.: 16/975,255

(22) PCT Filed: Jun. 24, 2020

(86) PCT No.: PCT/GB2020/051525
§ 371 (c)(1),
(2) Date: Aug. 24, 2020

(87) PCT Pub. No.: WO2021/032943
PCT Pub. Date: Feb. 25, 2021

(65) Prior Publication Data
US 2021/0232511 A1    Jul. 29, 2021

(30) Foreign Application Priority Data
Aug. 16, 2019 (GB) ..................... 1911780

(51) Int. Cl.
*G06F 12/14* (2006.01)
*G06F 12/02* (2006.01)
*G06F 12/1009* (2016.01)

(52) U.S. Cl.
CPC ...... *G06F 12/1441* (2013.01); *G06F 12/0238* (2013.01); *G06F 12/1009* (2013.01); *G06F 2212/1052* (2013.01)

(58) Field of Classification Search
None
See application file for complete search history.

(56) References Cited

U.S. PATENT DOCUMENTS

| 4,121,286 A | 10/1978 | Venton et al. |
| 6,594,752 B1* | 7/2003 | Baxter ............ G06F 9/30181 |
| | | 712/E9.035 |

(Continued)

FOREIGN PATENT DOCUMENTS

| EP | 0 026 589 | 4/1981 |
| WO | 2018/203032 | 11/2018 |

OTHER PUBLICATIONS

Search and Examination Report for GB1911780.3, dated May 19, 2020, 13 pages.

(Continued)

*Primary Examiner* — Charles Rones
*Assistant Examiner* — Ryan Dare
(74) *Attorney, Agent, or Firm* — Nixon & Vanderhye P.C.

(57) ABSTRACT

An apparatus comprises capability checking circuitry 86 to perform a capability validity checking operation to determine whether use of a capability satisfies one or more use-limiting conditions. The capability comprises a pointer and pointer-use-limiting information specifying the one or more use-limiting conditions. The one or more use-limiting conditions comprise at least an allowable range of addresses for the pointer. In response to a capability write request requesting that a capability is written to a memory location associated with a capability write target address, when capability write address tracking is enabled, capability write address tracking circuitry 200 updates a capability write address tracking structure 100 based on the capability write target address.

20 Claims, 6 Drawing Sheets

(56) References Cited

U.S. PATENT DOCUMENTS

2016/0292071 A1    10/2016  Varma
2017/0177429 A1*    6/2017  Stark .................... G06F 11/073
2017/0308309 A1*   10/2017  Cordero ............. G06F 11/2015
2018/0024769 A1*    1/2018  Howe ................ G06F 12/0215
                                                              711/106

OTHER PUBLICATIONS

Chisnall et al., "CHERI JNI", Architectural Support For Programming Languages And Operating Systems, ACM, *ASPLOS '17*, Apr. 8-12, 2017, pp. 569-583.
International Search Report and Written Opinion of the International Searching Authority for PCT/GB2020/051525 dated Sep. 3, 2020, 18 pages.
Examination Report for GB Application No. 1911780.3 dated Oct. 1, 2021, 5 pages.

* cited by examiner

CAPABILITY WRITE ADDRESS TRACKING

This invention was made with Government support under Contract Number HR001118C0016 awarded by the Defense Advanced Research Projects Agency (DARPA). The Government has certain rights in this invention.

This application is the U.S. national phase of International Application No. PCT/GB2020/051525 filed 24 Jun. 2020, which designated the U.S. and claims priority to GB Patent Application No. 1911780.3 filed 16 Aug. 2019, the entire contents of each of which are hereby incorporated by reference.

The present technique relates to the field of data processing.

Software executing on a data processing apparatus may use pointers to control access to memory. However, pointers can sometimes provide an avenue which a malicious attacker could use to attack victim software, for example exploiting buffer overflows to use a pointer for identifying a location in a buffer to access a region of memory beyond the buffer which the attacker would not otherwise be allowed to access. Some processor architectures may support use of capabilities, which associate the pointer with pointer-use-limiting information specifying one or more use-limiting conditions which limit the scenarios in which the pointer can validly be used. The use-limiting conditions may include at least a defined allowable range of addresses for the pointer, so that if the pointer is used to access a region of memory outside the allowable range then an error can be signalled. This can help to protect against some forms of attack.

At least some examples provide an apparatus comprising: capability checking circuitry to perform a capability checking operation to determine whether use of a capability satisfies one or more use-limiting conditions, the capability comprising a pointer and pointer-use-limiting information specifying the one or more use-limiting conditions, the one or more use-limiting conditions comprising at least an allowable range of addresses for the pointer; and capability write address tracking circuitry, responsive to a capability write request requesting that a capability is written to a memory location associated with a capability write target address, when capability write address tracking is enabled, to update a capability write address tracking structure based on the capability write target address.

At least some examples provide a method comprising: performing a capability checking operation to determine whether use of a capability satisfies one or more use-limiting conditions, the capability comprising a pointer and pointer-use-limiting information specifying the one or more use-limiting conditions, the one or more use-limiting conditions comprising at least an allowable range of addresses for the pointer; and in response to a capability write request requesting that a capability is written to a memory location associated with a capability write target address, when capability write address tracking is enabled, updating a capability write address tracking structure based on the capability write target address.

At least some examples provide a computer program for controlling a host data processing apparatus to provide an instruction execution environment for executing target code, the computer program comprising: capability checking program logic to perform a capability checking operation to check whether use of a capability satisfies one or more use-limiting conditions, the capability comprising a pointer and pointer-use-limiting information specifying the one or more use-limiting conditions, the one or more use-limiting conditions comprising at least an allowable range of addresses for the pointer; and capability write address tracking program logic, responsive to a capability write request requesting that a capability is written to a memory location associated with a capability write target address, when capability write address tracking is enabled, to update a capability write address tracking structure based on the capability write target address.

The computer program may be stored on a computer-readable recording medium. The recording medium may be a transitory recording medium or a non-transitory recording medium.

At least some examples provide a method comprising: enabling capability write address tracking by a capability write address tracking structure for tracking capability write target addresses of one or more capability write requests, where a capability write request comprises a request to write a capability to a memory location associated with a capability write target address specified by the capability write request, and the capability comprises a pointer and pointer-use-limiting information specifying one or more use-limiting conditions including at least an allowable range of addresses for the pointer; sweeping memory to invalidate stale capabilities, the stale capabilities comprising capabilities for which the allowable range of addresses overlaps with one or more target regions of addresses; and after sweeping the memory, re-sweeping one or more selected memory address regions corresponding to addresses tracked by the capability write address tracking structure, to invalidate stale capabilities stored in the one or more selected memory address regions.

At least some examples provide a computer program for controlling a data processing apparatus to perform the method comprising the enabling, sweeping and re-sweeping steps described above. This computer program may be stored on a computer-readable recording medium. The recording medium may be a transitory recording medium or a non-transitory recording medium.

Further aspects, features and advantages of the present technique will be apparent from the following description of examples, which is to be read in conjunction with the accompanying drawings, in which.

Figure 1:
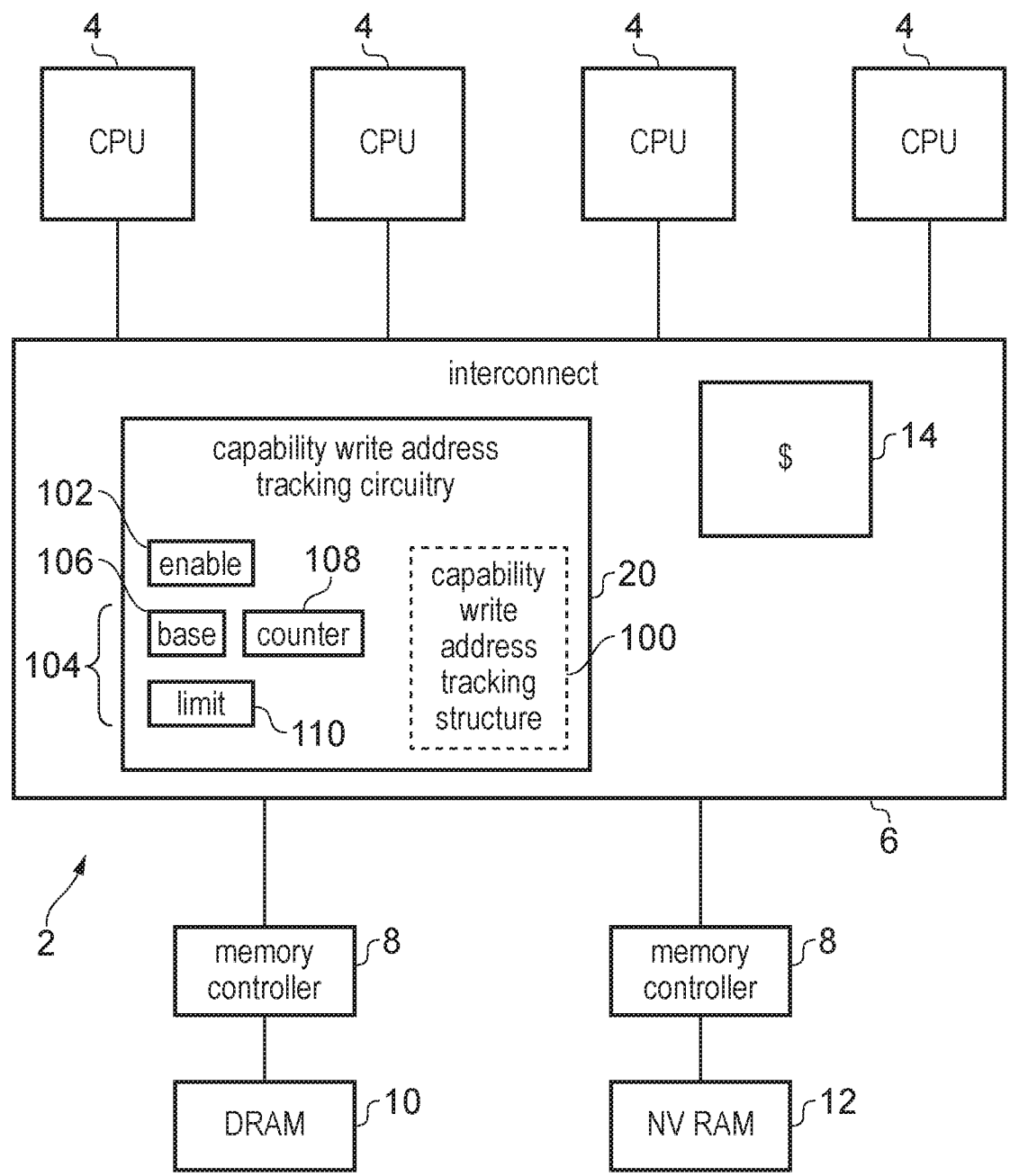
FIG. 1 shows an example of a data processing apparatus having multiple processor cores and capability write address tracking circuitry.

A data processing apparatus has capability checking circuitry to perform a capability checking operation for determining whether use of a capability satisfies one or more use-limiting conditions. The capability comprises a pointer and pointer-use-limiting information which specifies the one or more use-limiting conditions. The one or more use-limiting conditions may comprise at least an allowable range of addresses for the pointer. The use-limiting conditions could also optionally include other conditions, such as whether the capability can be used for controlling a write to memory or whether it is allowed to fetch an instruction to be executed from a memory region accessed via the capability, for example. By providing the capability checking circuitry, this provides some hardware-based enforcement of protections against malicious use of pointers which could otherwise be used to mount an attack on vulnerable software.

Such capabilities may be written to arbitrary addresses within a memory address space. If a capability for which the allowable range covers a given memory region is resident in memory, and the given region is then deallocated, it may not be safe to reallocate the given region to a given software process until any capabilities in memory covering that given region have been invalidated. While for a time it may be possible to simply prevent deallocated memory being reallocated in case there are still capabilities which cover the deallocated region stored in the memory system, this will tend to lead to fragmentation of memory and performance loss. Non-reuse of memory is equivalent to a memory leak (loss of available memory address space due to failure to deallocate memory), which, even with large address spaces, may eventually cause overflows potentially compromising security. Hence, although memory can be prevented from being reallocated for a time, eventually it may be desirable to be able to sweep the memory to identify stale capabilities whose allowable range of addresses cover the previously deallocated region of memory, to allow the deallocated regions to be reused for other purposes.

While performing such sweeps of memory for stale capabilities (typically controlled by software), there may be a risk that while the sweep is ongoing other processor cores or threads could be writing capabilities into already swept memory regions. This can be mitigated against by stopping all other processor cores continuing with their processing while the sweep is being performed on a given processor core, or by changing memory access permissions to prevent capability write operations being allowed, but these approaches have a significant performance impact. Also, in such a "stop the world" approach, the sweep process would need to set configuration registers to specify that the sweep process cannot be interrupted, to prevent an attacker from interrupting the sweep and copying a capability into previously swept memory before resuming the sweep. However, this means legitimate sources of interrupts are also disabled from being serviced, increasing interrupt handling latency which may be undesirable for real-time systems which require limits on the maximum time taken to handle interrupts.

In the techniques discussed below, the apparatus comprises capability write address tracking circuitry, which is responsive to a capability write request requesting that a capability is written to a memory location associated with a capability write target address, when capability write address tracking is enabled, to update a capability write address tracking structure based on the capability write target address. Hence, by providing tracking hardware which can track the addresses to which capabilities have been written, this allows identification of which addresses have been written with capabilities while a sweep was ongoing, so that it is possible to relatively efficiently re-sweep any written locations after the main sweep has finished to guard against the possibility of capabilities being written into already swept memory. Hence, the architectural provision of the capability write address tracking circuitry in hardware enables more efficient sweeps because this avoids the need for the sweeping process to stop processing at all other cores while the sweep is ongoing, which can greatly improve performance.

The tracking by the capability write address tracking circuitry may be specific to capability write requests. Hence, in response to non-capability write requests which request that information other than a capability is written to a memory location associated with a non-capability write target address, the capability write address tracking circuitry may ignore such non-capability write requests, so that the capability write address tracking structure is not updated based on the target address of the non-capability write request.

The capability write address tracking structure may be accessible to software executing on the apparatus. Hence, when sweeps for stale capabilities are controlled by software, the software can identify which locations in memory should be re-swept, based on the information in the capability write address tracking structure.

Some systems could permanently enable the capability write address tracking circuitry, so that during regular processing a record is maintained of addresses written with capabilities. However, in practice this may require a relatively large capability write address tracking structure and the circuit area, power and performance overheads associated with permanently tracking addresses of capability write requests may not be justified.

In other examples, an enable storage element may be provided to store a capability write address tracking enable indication which indicates whether the capability write address tracking is enabled or disabled. When capability write address tracking is enabled then in response to a capability write request, the capability write address tracking circuitry updates the capability write address tracking structure based on the capability write target address. On the other hand, when the capability write address tracking enable indication indicates that capability write address tracking is disabled, then the capability write address tracking circuitry omits updating the capability write address tracking structure based on the capability write target address of any received capability write request. By providing the ability to enable or disable the capability write address tracking, this can allow a smaller capability write address tracking structure to be used since address tracking is only needed to be enabled at the times when it is important to know which addresses have been written with capabilities and can be disabled otherwise to avoid capturing information that is not useful.

The system may have processing circuitry for executing program instructions. The processing circuitry may have an instruction set architecture which supports at least one program instruction which controls the processing circuitry to update the capability write address tracking enable indication. For example the program instruction could be a dedicated capability write address tracking enable or disable instruction, or could be a system register update instruction which is used for general control register updates and specifies a parameter identifying that the register to be updated is the capability write address tracking enable storage element. Hence, software is able to set whether the tracking by the capability write address tracking circuitry is enabled or disabled, by executing the program instruction for setting or clearing the capability write address tracking enable indication. For example software controlling a sweep for stale capabilities as discussed above may enable the capability write address tracking just before starting the sweep and then disable it again when the sweep is complete, to enable detection of any addresses to which capabilities were written while the sweep was ongoing.

The capability write address tracking structure may track addresses at a coarser granularity than the granularity with which a capability write request specifies the capability write target address. For example, the capability write address tracking structure could identify a page or block of addresses to which a capability was written, without identifying the particular address within the page/block at which the capability was written. This can reduce the storage overhead of the tracking structure.

The apparatus may have a cache structure which has a number of entries, each entry storing cached information associated with a corresponding memory address region. In response to the capability write request, when the capability write address tracking structure is updated based on the capability write target address, the capability write address tracking circuitry may also set a capability-written indicator in an entry of the cache structure corresponding to a memory address region including the capability write target address. Hence, cache entries can be tagged with an indication of whether any capability write to the corresponding memory address region has been detected. In response to the capability write request, when capability write address tracking is enabled and the capability write target address corresponds to a memory address region for which a corresponding cache entry already has the capability-written indicator set, the capability write address tracking circuitry may omit updating the capability write address tracking structure based on the capability write target address.

Hence, by tagging cache entries with information on whether at least one capability write request to the corresponding memory address region has been detected, this can avoid redundantly allocating multiple updated entries of the capability write address tracking structure for the same region, as on a subsequent capability write to the same region which has already been subject to a capability write, the update of the capability write address tracking structure can be omitted. This may make more efficient use of a capability write address tracking structure which may have limited capacity.

The cache structure in which the capability-written indicator is set could be one of a range of different types of cache structure. For example, the cache structure could be a data cache for caching data obtained from memory, an instruction cache for caching instructions fetched from memory, or a dedicated capability write address tracking cache which may have entries for capability write address tracking purposes only. However, in one example it can be particularly useful if the cache structure comprises an address translation cache for storing address translation information derived from a page table structure in memory. For example the cache structure may comprise a translation lookaside buffer (TLB). A TLB may track address regions at relatively large granularities, such as the page granularity with which the page table structures are defined in memory, and so this may make tracking the capability-written indicators more efficient than alternative cache structures which may track addresses at a more fine-grained granularity. Also, unlike other cache structures, in practice the address translation cache may be looked up for capability write requests anyway, to obtain the physical address of the region subject to the write operation, and so it may be relatively efficient to check the capability-written indicator in an address translation cache entry when receiving capability write requests. Nevertheless other types of cache structure could also be used to track the capability-written indicators for respective memory address regions.

On evicting an entry having the capability-written indicator set from the address translation cache (or in a system having multiple levels of address translation cache, evicting such an entry from the final level of address translation cache), the address translation cache may discard the capability-written indicator without writing the capability-written indicator back to the page table structure in memory. Although this could mean that, on eviction of an entry with the capability-written indicator set, the information that a previous capability write request targeted that region is lost, and so it is possible that if a subsequent capability write request targets the same region again then this may result in multiple entries of the capability write address tracking structure being allocated for the same region, this may be preferable to updating the page table structure with the capability-written indicator. Page table structures may already occupy a very large amount of memory space and increasing the size of each page table entry even by 1 bit may in practice require multiple extra bits of memory space to be allocated in each page table entry because of alignment of page table entries with a power of 2 address size boundary, and so in practice increasing the size of the page table entries to accommodate the capability-written indicator may have a significant impact on the size of the page table structures, which may be undesirable. Hence, occasionally needing to allocate a redundant entry in the capability write address tracking structure may be preferable to writing back the capability-written indicator to the page table structures.

Processing circuitry may process instructions from one of a number of software processes, each software process being associated with a corresponding execution context identifier. For example the execution context identifier may be used by a TLB to distinguish different sets of address translation information associated with the respective software processes. When capability write address tracking is enabled, the capability write address tracking circuitry may maintain execution context identifier tracking information for tracking one or more execution context identifiers associated with one or more capability write requests. This can be useful because it means that when then later using the capability write address tracking structure to control which memory regions need to be re-swept for stale capabilities, the execution context identifier tracking information can be used to avoid some unnecessary re-sweeps of memory address regions which were not subject to a capability write within the same execution context but have virtual addresses which alias those used by the process being swept. This can improve performance for processes for sweeping for stale capabilities.

The processing circuitry may also support a capability write address tracking reset instruction, which can be used to reset the capability write address tracking structure. For example this instruction could be executed either at the start of a sweep process or at the end of a sweep process. The capability write address tracking reset instruction could be the same instruction as the instruction which enables or disables the capability write address tracking, or could be a separate instruction. When the capability write address tracking structure is reset, the structure may be reset to a state equivalent to indicating that no addresses have been subject to any capability write requests. For example this could be done by clearing all data entries in the capability write address tracking structure, or by allocating a new structure in memory and updating any address parameters which identify the location of the new structure.

The capability write address tracking structure can be implemented in different ways. For example the structure could comprise a storage unit provided in hardware separate from memory. Hence, a dedicated unit implemented in hardware could be provided for tracking address information of addresses subject to capability write operations.

Alternatively, the capability write address tracking structure could simply be a data structure stored in memory at a given set of addresses. In this case the capability write address tracking circuitry may have hardware for updating and accessing the capability write address tracking structure, but may not have circuitry in hardware for holding the capability write address tracking information itself. When the capability write address tracking structure is maintained in memory, in one example the structure could be a buffer comprising a number of entries which each specify an address of a memory region subject to at least one capability write. The address tracking could be at different granularities, for example at cache line or at page-level granularity. In one example, at least one tracking metadata storage element may be provided to help identify the location in memory at which the capability write address tracking structure is stored. For example the at least one tracking metadata storage element may store at least one of: a base address of the capability write address tracking structure; an indication of a next entry of the capability write address tracking structure to be updated; and a limit indication indicative of a maximum permitted size for the capability write address tracking structure. Here, the indication of the next entry to be updated could be explicit or implicit, for example the indication of the next entry could be identified by identifying the previous entry written, which may implicitly identify which entry is next. The indication of the next entry could be represented either as a count value (which can be used to derive the address of the next entry to be updated, by applying a number of increments to the base address, the number of increments selected based on the count value, and the increment corresponding to a size of one entry) or as an absolute address identifying the location in memory of the next entry or the previously written entry.

The limit indication can be useful because it can allow the capability write address tracking circuitry to track whether so many entries have been allocated to the capability write address tracking structure that a maximum permitted size has been exceeded or is in danger of being exceeded, so that this can avoid the tracking structure spilling out into subsequent regions of memory which may contain other information.

In some examples the capability write address tracking structure may precisely track one or more capability write target addresses of one or more capability write requests received when capability write address tracking is enabled. For example the tracking structure could maintain a list or cache like structure identifying the specific addresses associated with any received capability write request. The precise tracking could be at different granularities as discussed above, for example the precise tracking could be of page addresses rather than the individual cache line addresses of the capability write requests.

Alternatively, the capability write address tracking structure may imprecisely track one or more capability write target addresses of one or more capability write requests received when capability write address tracking is enabled. The imprecise tracking may be such that while false positives may be possible (so that querying of the capability write address tracking structure may allow an address other than one of the received capability write target addresses to be falsely identified as being a member of the set of received capability write target addresses) it is not possible to have a false negative (when one of the received capability write target addresses is not identified as such). For example a structure such as a Bloom filter can be used. Such imprecise tracking can reduce the amount of storage overhead needed for the capability write address tracking structure, at the expense of occasionally permitting false positives so some memory regions may be identified as regions to be re-swept, which actually do not correspond to regions which were subject to capability write operations.

In response to detecting that the capability write address tracking structure has reached a capacity limit (for example based on the limit indication as discussed above), the capability write address tracking circuitry may trigger signalling of an exception. Software can then respond to the exception by either updating the size of the address tracking structure to allow continued tracking, or by halting any sweep of stale capabilities that may be ongoing and restarting the sweep again. For some implementations, it may not be necessary to trigger an exception as it may not be possible to exceed the capacity of the tracking structure, for example with a Bloom filter approach then any number of addresses can be folded into the Bloom filter without increasing the size of the Bloom filter, but for other approaches such as a linked list or buffer then the size may eventually outgrow the capacity of the memory space allocated for the capability write address tracking structure, and so it is useful to provide architectural features for detecting that the capacity limit has been reached and then signalling an exception.

In some examples the data processing system may include multiple processor cores. The capability write address tracking structure may be shared between the cores. Also the capability write address tracking circuitry could be shared between the cores. It may be expected that it is relatively rare that more than one core needs to do sweeps and so a shared tracking structure may be enough. Also sharing the tracking between cores makes it easier to check whether any of the cores has issued a capability write request.

Alternatively, other approaches may provide separate capability write address tracking structures for individual cores, or may provide some of the hardware for updating the shared tracking structures specific to individual cores. For example each core may separately update its TLB or other type of cache with the indicator for specifying whether a capability write request has targeted a particular address region. Hence there are a number of ways in which the circuitry discussed above can be implemented in a multi-core system. The above examples describe hardware circuitry for performing the capability checking operation and the capability write address tracking. It is also possible to provide a computer program which executes on a host data processing apparatus to control the host to provide an instruction execution environment for executing target code, so that the target code can be executed on the host data processing apparatus as if it was being executed on a target data processing apparatus which may have a different architecture to the host. This can be useful for enabling legacy code written for a different processor architecture to be executed on a new platform, or for allowing testing of a processor architecture in development, or for allowing software designed for operation on a new processor architecture to start to be developed before any hardware devices which support the new architecture are actually ready. Hence, the simulator computer program running on the host may effectively emulate features of the processor architecture of the target data processing apparatus so that the target code may execute on the host as if it is executing on the target data processing apparatus. Such a simulator computer program may comprise capability checking program logic and capability write address tracking program logic which emulates the functionality of the capability checking circuitry and capability write address tracking circuitry discussed above.

The above discussion has described the architectural features of a processing system provided in hardware, or architectural features of a corresponding simulator computer program, which enables software to identify which addresses have been written to using capability write requests, which can be useful for sweeps of stale capabilities. While particularly useful for such sweeps, it will be appreciated that software developers or compilers may find other uses for the capability write tracking structure.

In a corresponding method, a method of controlling sweeps to invalidate stale capabilities may be provided, using the capability write address tracking structure. Hence, this method, which may be controlled by software, may comprise enabling the capability write address tracking by the capability write address tracking structure, then sweeping memory to invalidate stale capabilities, where the stale capabilities are those capabilities for which the allowable range of addresses overlaps with one or more target regions of addresses, and then after sweeping the memory, resweeping one or more selected memory address regions which correspond to addresses tracked by the capability write address tracking structure, to invalidate stale capabilities stored in the one or more re-swept selected memory address regions. Hence, by using the capability write address tracking structure, the sweeping process can avoid needing to halt processing at other processor cores or threads or prevent valid capability writes continuing, which can improve performance, as the tracking structure enables targeted re-sweeping of the memory regions subject to capability writes during the main sweep.

A computer program may be provided to control a data processing apparatus to perform the method discussed above. The computer program may be stored on a non-transitory computer-readable storage medium.

FIG. 1 schematically illustrates an example of a data processing system 2 comprising multiple processor cores (CPUs) 4. In this example there are four CPUs but it will be appreciated that more or fewer CPUs could be provided. The CPUs access a shared memory system via an interconnect 6 which, in addition to routing transactions between the cores 4 and memory, may also manage coherency between data cached in the respective processor cores 4. While not shown in FIG. 1, the system could also include other types of master device which may initiate memory transactions, such as a graphics processing unit, display controller, network controller or other types of device. Transactions initiated by the master devices are routed to slave devices by the interconnect. In this example the slave devices include memory controllers 8 for controlling access to memory units 10, 12. In this example the memory unit 10 is a dynamic random access memory (DRAM) unit and the memory unit 12 is a non-volatile RAM unit. It will be appreciated that other types of memory could also be provided and also other types of slave devices such peripheral controllers, input/output units etc. could be provided. The interconnect 6 may have a shared cache 14 which is accessible from any of the CPUs 4 and caches data from the underlying memory system.

In this example the interconnect also includes capability write address tracking circuitry 20, which will be discussed in more detail below. In other examples part or all of the capability write address tracking circuitry 20 could be distributed amongst the individual processor cores 4.

Figure 2:
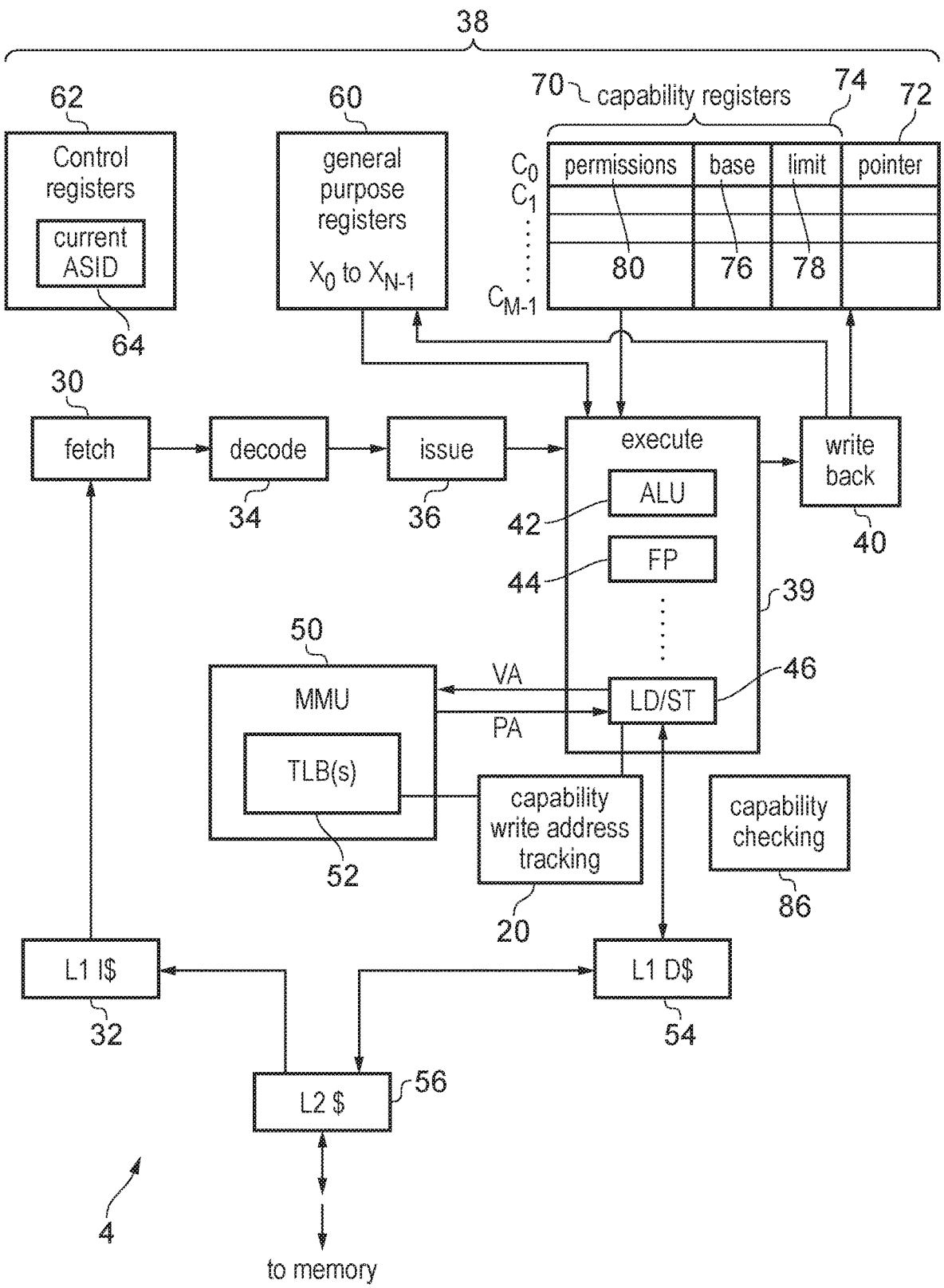
FIG. 2 shows an example of one of the processor cores.

FIG. 2 illustrates an example of components within a given one of the CPUs 4. The processor core 4 may include a processing pipeline which has a number of pipeline stages, including a fetch stage 30 for fetching program instructions from an instruction cache 32, a decode stage 34 for decoding the fetched instructions to generate control signals for controlling remaining pipeline stages to perform actions represented by those instructions, an issue stage 36 for checking whether any required operands for the instructions are available within registers 38 and issuing instructions for execution when their operands are available, an execute stage 39 for executing the issued instructions to perform corresponding processing operations of a type depending on the particular instruction that has been decoded, and a write back stage 40 for writing back results of executed instructions to the registers 38. In this example the execute stage 39 includes a number of execution units for executing different types of instructions. For example the execution units may include an arithmetic/logic unit (ALU) 42 for executing arithmetic or logical instructions on integer operands, a floating point unit 44 for executing floating point instructions on operands represented in a floating point format, and a load/store unit 46 for carrying out load operations to load data from the memory system to the registers 38 or store operations for storing data from the registers 38 to the memory system. It will be appreciated that other types of execute units could also be provided. Also, this is just one example of a possible pipeline architecture and other types of pipeline stages could also be provided. For example, in a processor supporting out-of-order processing, the pipeline could also include a rename stage for performing register renaming to map architectural registers specified by the instructions to physical registers provided in hardware.

The processor core 4 also includes a memory management unit (MMU) 50 for managing access to memory when requested by the load/store unit 46. The MMU 50 may perform address translation, to translate a virtual address provided by the load/store unit 46 into a physical address for identifying the data required from the memory system. The address translation is performed with reference to address translation data stored within page table structures within the memory. The MMU 50 includes one or more translation lookaside buffers (TLBs) 52 which act as address translation caches for caching information derived from the page table structures. The TLBs 52 could cache the page table entries themselves, and/or could cache information on addresses where the page table entries can be found in memory for translating particular virtual addresses, so that address translations for addresses for which relevant information is cached within the TLBs 52 can be performed more quickly than for addresses for which a page table walk is required to locate the relevant address translation information within the page table structures in memory. In some examples the MMU 50 may comprise a single TLB. Alternatively, the MMU 50 may have multiple levels of TLB 52, where the virtual address is first looked up in a level 1 TLB, and if there is a miss in the level 1 TLB then a level 2 TLB can be looked up, to trade off TLB capacity against latency. Also, while not shown in FIG. 1 for conciseness, the instruction fetches from the instruction cache 32 may also be subject to address translation, either using the MMU 50, or using a separate instruction-side MMU distinct from the data-side MMU 50.

The CPU 4 in this example may include a level 1 data cache 54 which is accessed in response to load/store instructions based on the physical address identified by the MMU 50, and also a shared level 2 cache 56 is provided shared between data and instructions which may be accessed if there is a miss in the level 1 instruction cache 32 or the level 1 data cache 54. It will be appreciated that this is just one example of a possible cache hierarchy and other arrangements could also be possible. Also it is possible to provide more than 2 levels of cache within the CPU 4, before requests are sent out to the memory if they miss in the last level of cache provided within the CPU. Hence there is flexibility to vary the exact design of the CPU 4.

The registers 38 include a number of types of registers. The registers 38 may include a set of N general purpose registers 60 for storing operands for instructions and the results of executed instructions. The general purpose registers 60 could include integer registers and floating point registers. Also the registers 38 may include control registers 62 which may store control parameters controlling the functioning of the processor core 4. There may be a number of different types of control registers, such as a program counter for indicating an address corresponding to the current point of execution, status flags which may be set depending on the outcomes of earlier executed instructions, and current mode registers which may indicate a current operating mode of the system. In the example in FIG. 2 the control registers 62 are shown as including a current execution context identifier register 64 which may store an indication of a current execution context identifier which is associated with the execution context currently being executed by the processing pipeline. The processor may support executing different software processes, and each software process may have a corresponding execution context identifier, more specifically an address space identifier (ASID). The address space identifier can be used by the MMU 50 to locate different sets of page table structures for the respective software processes, and entries in the TLB 52 may be tagged with the corresponding ASID to ensure that address translation requests triggered by a given execution context can only match against TLB entries which correspond to that execution context.

As shown in FIG. 2 the processor core 4 may also have a set of capability registers 70 which store capabilities. In this example there are M capability registers provided, $C_0$ to $C_{M-1}$. Each capability register 70 may store a capability which comprises an address pointer 72 which indicates a particular address in memory, and associated pointer-use-limiting information 74 which defines one or more conditions which limit valid uses of the pointer stored in the pointer field 72. The pointer-use-limiting information includes an indication of an allowable range of addresses within which the pointer 72 is allowed to be defined. In this example the allowable range is encoded by a base value 76 identifying a start address of the allowable range and a limit value 78 implicitly or explicitly identifying an end address of the allowable range (the limit 78 could be encoded either as an absolute address or as a size or offset to be applied to the base address 76). It will be appreciated that there could be other ways of encoding the allowable range information, for example by a range identifier which may then point to a separate table which includes the base and limit values 76, 78. In addition to the range information 76, 78, the capability registers may also store permissions 80 which may impose further use limitations on the use of the pointer. For example the permissions 80 could specify whether the range of allowable addresses corresponding to the capability can only be read or is allowed to be both read and written. Also the permissions 80 could specify whether it is allowable to fetch and execute an instruction stored at an address within the corresponding range of addresses. Also the permissions could specify whether the corresponding capability is allowed to be used to control loading or storing of other capabilities. Another type of permission may be one that specifies whether the capability can be shared with other software processes or is restricted to be used only by the current software process. Also, a permission could specify which privilege levels of software are allowed to use the capability. It will be appreciated that any one or more of these additional use limitations may be imposed by the permissions 80 and it is not necessary for all of these permissions to be supported by a given processor architecture.

Hence, in general by defining one or more use-limiting conditions, including at least an allowable range for the pointer 72, this means that the use of the pointer 72 is restricted in its applicability and this can be useful for preventing common software attacks such as buffer overflows or accesses to arbitrary memory addresses.

Figure 3:
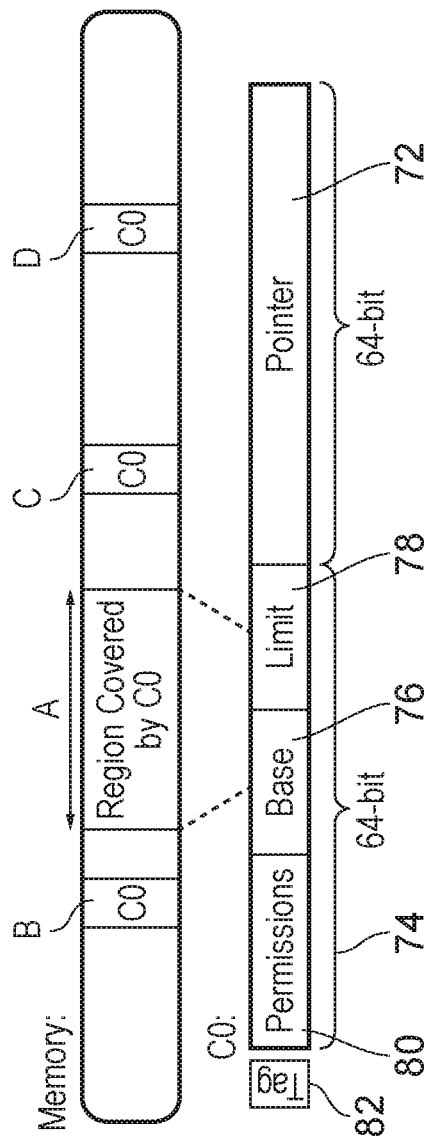
FIG. 3 shows an example of a capability and an example of how a capability can be copied to many locations within a memory address space.

As shown in FIG. 3, when a capability is stored in the memory system, then in addition to the pointer 72 and use-limiting information 74 the capability may also have an associated tag value 82 which specifies whether the capability is valid. This tag 82 is used by hardware to distinguish memory locations which store capabilities from memory locations which store conventional non-capability data. The tag value 82 is software-transparent, i.e. not part of address or memory, and can therefore be held separate from the capability itself.

The instruction set architecture supported by the processing pipeline may include instructions which interact with capabilities. For example the instruction set architecture may include support for capability setting instructions for writing a capability to one of the capability registers 70, instructions to load capabilities from memory into the capability registers 70, instructions to store capabilities from the capability registers 70 into memory, and instructions for using capabilities stored in the capability registers 70 to control data or instruction accesses to memory. When a capability stored in the capability registers 70 is used to control access to memory, then the use of the capability in the specified capability register is checked by capability checking circuitry 86, to check whether the scenario in which the capability is used is valid, based on the range information 76, 78 and the permissions 80 of the capability specified in the referenced capability registers 70. For example the capability checking circuitry 86 may check whether the pointer value 72 lies within the allowable range defined by the range information 76, 78 and whether the type of operation being requested (read or write or instruction fetch for example) is allowed given the specified permissions 80. Hence, the hardware of the capability checking circuitry 86 ensures that attempts to use the capability to access information outside of the allowable address region will fail, and also attempts to perform an inappropriate type of operation within the specified address region may also fail and potentially may raise a security exception. The memory permissions recorded in the page table structures for certain regions may support defining that some regions can only be accessed via a capability (and cannot be subject to non-capability reads/writes), which can enforce that the protections provided by a capability cannot be bypassed for certain regions. Also, some implementations may provide architectural support for an operating mode in which only capability-controlled accesses are allowed and non-capability-controlled accesses to memory may be prohibited, which can be selected if it is desired to ensure that capability protections are required for all access to memory.

Hence, the provision of an architecture which supports capabilities can provide spatial protection against attacks. However, a problem may still arise in that, as shown in the upper part of FIG. 3, software may move, copy and store capabilities freely, and so the same capability C0 may be held in multiple memory locations within the overall memory address space. For example, FIG. 3 shows a case where a capability C0 for which the range specified by the range information 76, 78 corresponds to address range A, is copied to 3 different locations B, C, D within the address space. Even if the memory address region A is subsequently deallocated and freed for potential use by other software processes, it can be risky to allow other processes to use that region for potentially sensitive information if it cannot be guaranteed that there are no stale capabilities C0 still stored in other regions of the memory address space which have range information covering the previously referenced region A.

Figure 4:
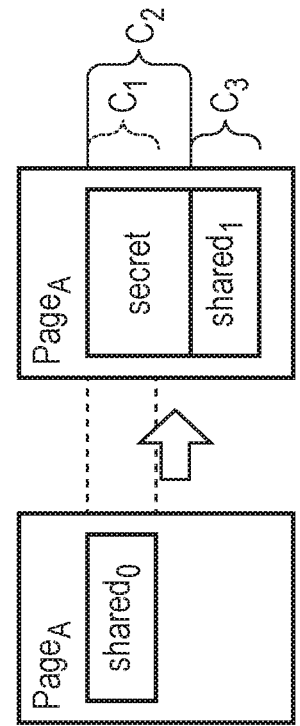
FIG. 4 illustrates an example of a revocation-based attack on a system using capabilities.

As an example of an attack that exploits such stale capabilities, FIG. 4 illustrates a use-after-free attack between a victim application and an untrusted library. It assumes that the underlying code and data segments are spatially isolated from each other based on capabilities. The attack relies on the victim deliberately sharing some of its memory with the attacker in form of the capabilities C1 and C3, e.g. an image processing application granting a filter library access to memory holding an image. The attacker hides C1 during the first call (by copying the capability C1 to some region of memory allocated to the attacker) and then recovers it during the second call. In the meantime, the victim process frees the region covered by capability C1, allocates a new memory region covered by capability C2, which is to hold some sensitive data. As memory allocators usually re-use memory that was previously freed, C2 may overlap the memory covered by C1. Hence, although the attacker was not given access to capability C2, and so the victim may expect that C2 is sufficient to protect against the access to the secret, the attacker might use the stale capability C1 to extract secret information held in the region associated with C2.

One approach to mitigate attacks like the one described above is to avoid memory re-use (i.e. to prohibit reuse of the memory region associated with C1 after deallocation). The implicit memory leak might be acceptable for systems with large virtual address spaces and applications that do not allocate vast ranges of memory or perform frequent allocation-free-cycles. However, even those systems may suffer from performance loss incurred from cache pollution in consequence of the inherent memory fragmentation. In any case, some form of revocation policy to invalidate all instances of a freed capability might be desirable to enable secure memory re-use.

For instance, capabilities to be freed might be added to a revocation list. The memory covered by those capabilities is not re-used until all instances of such capabilities are invalidated from memory. A revocation policy may gather capabilities on the revocation list up to a certain threshold of stale memory—e.g. 25% of the heap space—before triggering a revocation sweep. The sweep would then:

Search all registers and memory currently accessible by the target application

Identify all stale capabilities held there, for which the allowable range of addresses 76, 78 overlaps with at least one of the regions identified on the revocation list; and Invalidating the stale capabilities identified in the sweep, by clearing their tag 82.

However, when performing such a sweep, if other threads are running in parallel with the sweeping thread (e.g. on other processor cores 4), or if the sweeping software is interrupted and then other code is executed while it is interrupted before resuming the sweeping software after the interruption, then there is a risk that such other threads could write stale capabilities into already swept memory regions, which could risk some stale capabilities not being found in the sweep.

The naïve approach to addressing this would be to "stop-the-world" during the sweep, i.e. to halt all other threads and disable interrupts. However, the performance impact of this approach would be highly undesirable, or even unacceptable for real-time applications.

One approach to accelerate revocation sweeps would be to limit the movement of capabilities. For instance, a "per capability" permission bit might be used to determine whether a capability could be used as base address of a capability store. The allocator could then exclude all regions of memory from being swept, for which it didn't provide at least one capability with said permission bit set. Similar permission bits might also be assigned to pages. This could allow the operating system (OS) to exclude large regions of memory from sweeps, as they would not be able to hold capabilities.

"Can store capability" permission bits restrict which regions of memory may hold capabilities. However, they do not provide any information on the actual contents of these regions; e.g. even though a page can store capabilities, it might not contain any at runtime, and therefore would not need to be swept. To remedy this, a "capability dirty" bit might be associated with each page. It would be set the first time a capability is written to a particular page. The sweep algorithm could evaluate the bit to skip those pages during sweeps.

However, the above approaches exhibit three key limitations:

a) Scaling
   An application may exhibit large memory footprints, such as databases encompassing several terabytes;
   The sweep process might have to retrieve and evaluate permission bits corresponding to a large number of pages and/or capabilities;
   This may incur significant performance overheads, especially for cases when the corresponding page tables do not reside in cache at the start of the sweep b) Number of Pages that can be Excluded from Sweeping
   Permission bits are likely to rely on information available at compile time and may therefore be overly permissive;
   Dirty bits are more dynamic but may over time approach the same number of pages as permission bits, i.e. the likelihood of a capability store to a page increases over time. Clearing dirty bits during sweeps is possible, but only pages that are known to no longer contain any capabilities can be cleared.

c) Provide Information in Software to Avoid Having to Stop-the-World During Sweeps
   To allow parallel threads or interrupts during sweeps, one can detect or prevent the write of stale capabilities to previously swept memory
   Page permissions could be used to temporarily forbid capability writes to swept pages. However, this would also affect writes of regular capabilities to said regions. Exception handlers may be required to distinguish those cases.
   As dirty bits can only be cleared for pages that don't hold any capabilities, they are unsuitable for tracking write of stale capabilities only.

Hence, the approaches discussed above have a significant performance impact. In contrast, as shown in FIGS. 1 and 2, the approach discussed below provides capability write address tracking circuitry 20 in hardware which can track addresses subject to capability write operations within a capability write address tracking structure 100. The capability write address tracking circuitry 20 could be either shared between multiple processor cores 4 as shown in FIG. 1, or provided within an individual processor core as shown in FIG. 2, or a hybrid of these approaches where some tracking hardware is shared and other hardware is provided separately for each core 4. The capability write address tracking structure 100 itself could be either a dedicated hardware storage unit or could be a data structure which is actually stored within the memory system and is maintained by the capability write address tracking circuitry 20. The capability write address tracking circuitry 20 may be associated with an enable register 102 which controls whether tracking of addresses of capability write operations (operations to write a capability to memory from the capability registers 70) is enabled or disabled, as well as a number of tracking metadata registers 104 which may, in implementations which use a tracking structure stored in the memory system, identify the location of the tracking structure in the memory. For example the metadata registers 104 may include a base address 106 which identifies the start address of the tracking structure and a counter register 108 which marks the point within the tracking structure at which the next entry is to be written. Also the metadata registers may include a limit register 110 which may specify a maximum size permitted for the address tracking structure, to guard against overflows. The various registers 102, 104 may be updatable by software.

Hence, by providing tracking circuitry 20 in hardware, this can help to accelerate revocation sweeps by avoiding the need for stop-the-world sweeps. Capability writes to memory are tracked during a revocation sweep. At the end of a sweep, this tracking information can be used to selectively re-sweep, to locate stale capabilities written by other threads or during interrupts to the sweep process. In some examples, the capability write address tracking may use the translation lookaside buffers (TLBs) 52. For example, outside of revocation sweeps, the TLB may not track capability writes. At a start of a sweep, tracking of capability writes may be enabled. During a sweep, the TLB 52 may set a dirty bit on a capability write to corresponding page of addresses, and on a transition of a dirty bit from 0 to 1, record the address and ASID of the dirty page in a structure 100 maintained within memory at the addresses identified by the metadata registers 104. The sweep algorithm does not itself write any valid capabilities to memory; hence, it will not set any dirty bits—any dirty bits that are set may be caused by capability writes performed by other threads (which may either be executing in parallel with the sweep algorithm or may execute during an interruption of the sweep algorithm). At the end of a sweep, the sweep algorithm may check the capability write address tracking structure 100 and selectively re-sweep the pages indicated as dirty, to locate and invalidate stale capabilities written by other threads or during interrupts, and clear their record in the tracking structure 100. Optionally, to prevent further writes of stale capabilities to avoid subsequent re-sweeps, the sweeping algorithm, could, during the re-sweep, set the store capability permissions to prevent capability writes, or use a stop-the-world approach to halt processing of other threads.

Figure 5:
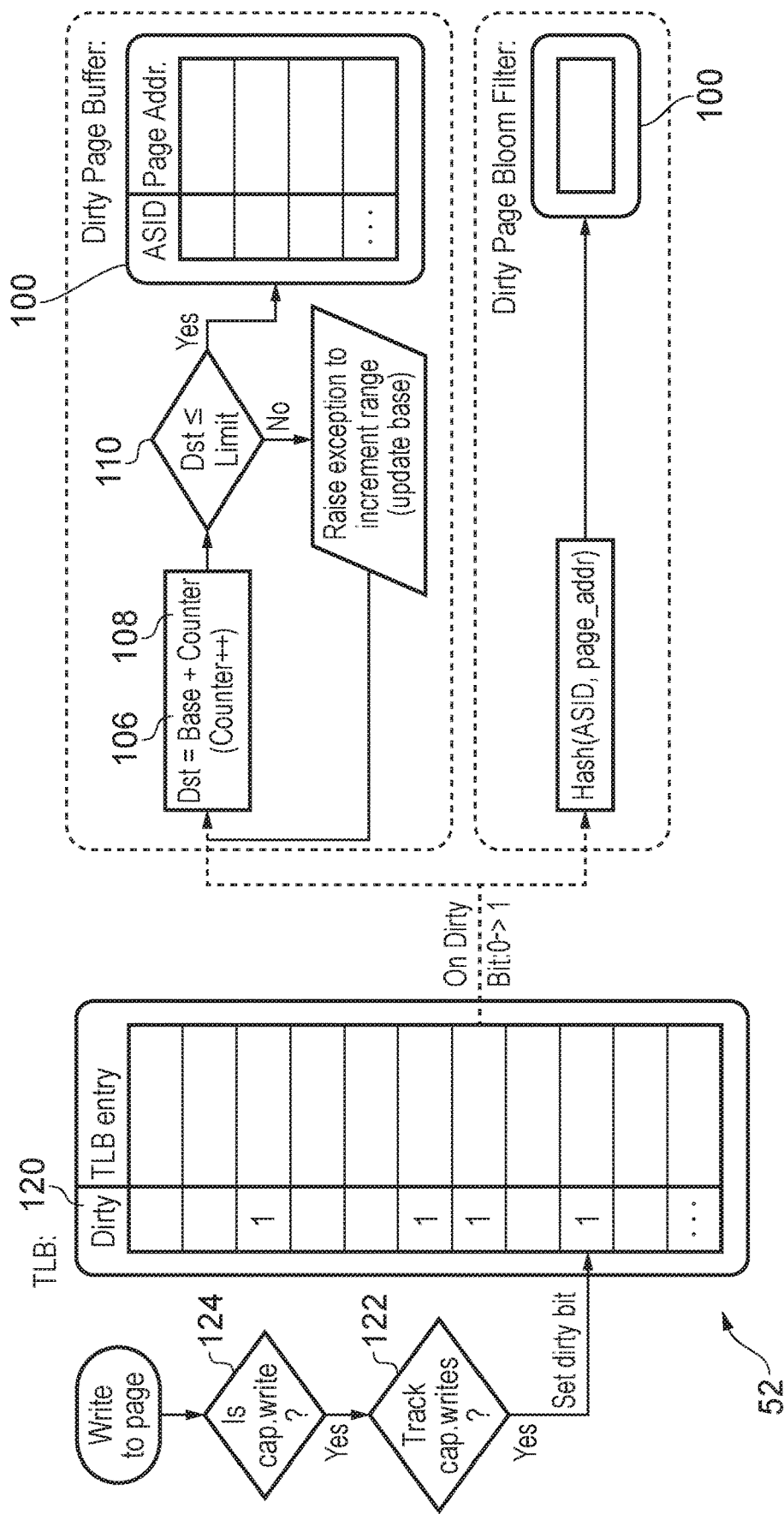
FIG. 5 shows several examples of tracking capability write addresses.

FIG. 5 illustrates examples for hardware that may be employed to track the pages "dirtied" by capability writes. TLB entries in the TLB 52 may be extended to each store a dirty bit (capability-written indicator) 120. Note that this bit 120 does not carry over to page tables, so it does not impact the already large overheads associated with those tables (when a TLB entry is evicted from the last level of TLB which stores dirty bits 120, the dirty bit may simply be discarded). As shown in decision box 122 of FIG. 5, the update of dirty bits 120 may be enabled/disabled by the enable control register 102 (set by software), to limit the tracking of capability stores to certain periods selected by software, e.g. when the software is performing a stale capability revocation sweep. Hence, when not tracking capability writes, the dirty bit would not be set, even if there is a capability write to a given page not previously dirtied. Also, as shown in decision box 124 of FIG. 5, writes to a given page of a type which write non-capability data would not cause the dirty bit 120 to be set—the tracking is specific to capability write operations which request that a capability is written to the corresponding location in memory.

Also, on transition of a dirty bit 120 for a given page of addresses from 0 to 1, the address of the corresponding page and its Address Space Identifier (ASID) are recorded in the capability write address tracking structure 100. While it is not essential to record ASIDs, this can be useful so that software can avoid some unnecessary re-sweeps of pages associated with a different ASID that alias those used by the process-being-swept.

FIG. 5 illustrates two examples for capability write address tracking structures 100 that may be used to record the address/ASID information on dirtied pages. These examples are alternatives—it is not necessary to provide both.

The top example in FIG. 5 shows a dirty page buffer which uses the base address register 104 and the counter register 108 to record information in sequential order. Each time a new page (not previously indicated as dirty in the corresponding TLB entry) is dirtied by a capability write operation when capability write tracking is enabled, the capability write address tracking circuitry 20 writes the ASID and page address of the dirty page to an entry at an address "Dst" obtained by adding a certain number of increments of a given size to the base address in the base register 104, where the number of increments is selected based on the counter register 108. As the buffer might be held in memory, a limit register 110 is used to avoid overflows, by signalling an exception if the calculated address Dst exceeds the limit. In response to the exception, an exception handler may trap to an operating system or other supervisory code, and could trigger various buffer overflow handling responses, including any of: (i) updating the limit register 110 to expand the space available for the dirty page buffer (possibly after moving data from the region of memory immediately after the buffer to a different part of the address space); (ii) allocating a new block of memory for the dirty page buffer, of a larger size than the previously allocated buffer, copying the entries of the current dirty page buffer to the newly allocated block of memory, and then updating the base address 106 and limit registers 110 to correspond with the newly allocated block of memory; or (iii) causing the sweeping software to start its sweep again, in the hope that next time fewer capability writes may occur while the sweep is being performed. The metadata registers 104 and the buffer contents 100 may be restricted to only be accessible by privileged software, e.g. the revocation code. This might for instance be ensured by using a data capability encompassing the buffer that is not shared outside the revocation code, and setting a privilege bit in the permissions 80 in the code capability encompassing the revocation code.

Assuming reasonable fast revocation sweeps, it is unlikely that multiple threads will be executed on the same core. Hence, it might be inefficient to store ASIDs with each buffer entry as shown in FIG. 5. As an alternative, the dirty page buffer 100 could record each page address dirtied by a capability write, but a smaller list of ASIDs may be maintained, with only unique ASIDs not previously seen in a capability write being added to the ASID list. Alternatively, instead of a precise list of ASIDs, a single register could track all observed ASIDs using a Bloom filter (separate from the precise list of dirtied page addresses in the dirty page buffer). This trades off reduced memory overheads against the potential of false positives.

With the dirty page buffer approach shown in the upper part of FIG. 5, this may provide some advantages:
   the counter can be used to determine the index of last valid entry (counter−1), so there is no need for validity bit with each entry;
   Limited hardware complexity, as one adder can be used for both the address computation and the counter update;
   re-uses TLB circuitry in the MMU 50 to handle writes to memory;
   high precision of address identification, so software will only have to re-sweep pages known to have been dirtied by capability writes.

The lower part of FIG. 5 shows an alternative approach, which uses a Bloom filter as an alternative to a page buffer. Like the buffer, it is updated on transitions of dirty bits from 0 to 1, but uses a hash of page address and ASID, and any bits of the Bloom filter corresponding to the result of the hash are set (if not already set). This provides less precise tracking of the addresses. When reading the tracking structure 100 to decide which pages to re-sweep, the sweeping software may assume that any page address which hits against the Bloom filter representation (i.e. for which the hash of the page address gives a value for which all bits of 1 within the hash value match bits set in the Bloom filter representation) could be one of the pages which was dirtied by a capability write. It is possible this may include some false positives, where a page not actually dirtied by a capability write is detected as having been dirtied, due to the hash of its address aliasing against a combination of bits set in response to writes of capabilities to other pages. While such false positives could sometimes be costly (in terms of the performance cost of unnecessarily re-sweeping some pages), the risk depends on the hashing algorithm used and the distribution of addresses of the dirtied pages, and this risk may be acceptable to enable other benefits such as:
   Reduced hardware complexity (as it just requires a simple hash and OR circuitry, no full adders or memory accesses)
   Able to handle unlimited number of pages, without risk of buffer overflows;
   No use of system memory
   No need for exceptions to increase number of entries
   Unaffected by duplicates (if the same TLB entry evicted, re-fetched and dirtied again, updating the Bloom filter again based on the page's address does not change the size of the structure or the pages identified as needing re-sweeping, unlike for the dirty page buffer where there is a risk of duplicate entries which either require some processing to eliminate duplicates or waste performance in unnecessary re-sweeps).

There are many other alternatives to the presented examples. For instance, both examples might be combined into a table structure indexed by a hash of page addresses. Each entry might then hold a Bloom filter to represent all pages aliasing into it. This mitigates the need to grow buffers at runtime and reduces the risk of false positives. Alternatively, using a linked list instead of Bloom filters with each entry could eliminate the risk of false positives but would also increase the complexity of the structure. Note that the limited buffer size mentioned above is unlikely to be a significant factor, as the number of pages dirtied during a revocation sweep is likely to be small.

In the context of multi-core environments, revocation sweeps may need to prevent or detect writes of stale capabilities to previously swept memory, handle legitimate accesses to pages currently being swept, and locate stale capabilities held within registers and other memory structures pertaining to other cores. The dirty page tracking structures discussed above enable the detection of writes of stale capabilities to previously swept memory, without the need to stall other threads. As they only detect—rather than prevent—such writes, dirty pages may need to be re-swept. To avoid the need for subsequent iterations, the algorithm may stop-the-world during re-sweeps. Alternatively, it might temporarily clear the "can store capability" permission bits of pages being swept. Parallel threads attempting to write capabilities to those pages would therefore trap into the OS. The corresponding exception handler would need to be sweep aware. Outside of sweeps it would handle legitimate page permission violations. During a sweep, it could delay its return until the sweep completes or return immediately to the thread. The latter would trigger the replay of the offending capability store, leading to further exception events until the sweep completes by restoring the original page permissions. More complicated handlers may allow threads to continue even during ongoing sweeps.

The proposed tracking structures may either be shared between cores or replicated for each individual core. As the initial dirtying of pages is considered rare, it may be feasible to share the associated hardware overheads between cores. In case of replicated structures, ASIDs may be used by the sweep algorithm to skip structures not pertaining to the process currently being operated upon. As mentioned above, the provision of ASIDs is optional.

One way for software to clear stale capabilities held in registers of another core, is to identify relevant threads based on their ASID, trigger a context switch, and evaluate the contents of the swapped-out registers in memory. These context switches may be performed at the end of revocation sweeps, i.e. once all stale capabilities have been removed from memory. This would allow the immediate return to the switched-out threads, without the risk of them being able to retrieve stale capabilities from memory.

While the example in FIG. 5 shows tracking of dirty pages in the TLB, it is also possible to use another type of cache (such as the L1 data cache 54) to track blocks of addresses subject to a capability write. Also, in some examples, the use of the dirty bit 120 to track addresses subject to a capability write may not be needed at all—in these examples on a capability write to a given address when capability write address tracking is enabled, the tracking circuitry 20 may simply update the capability write address tracking structure 100 regardless of whether a capability write to the same address has already been done before. For example, in the Bloom filter example there may be less disadvantage of redundantly updating the structure multiple times for the same address, so that the overhead of checking the dirty bits 120 may not be considered necessary. On the other hand, for the dirty page buffer example, the use of the dirty bits 120 can be very useful to reduce the likelihood of duplicate entries being allocated to the buffer.

Figure 6:
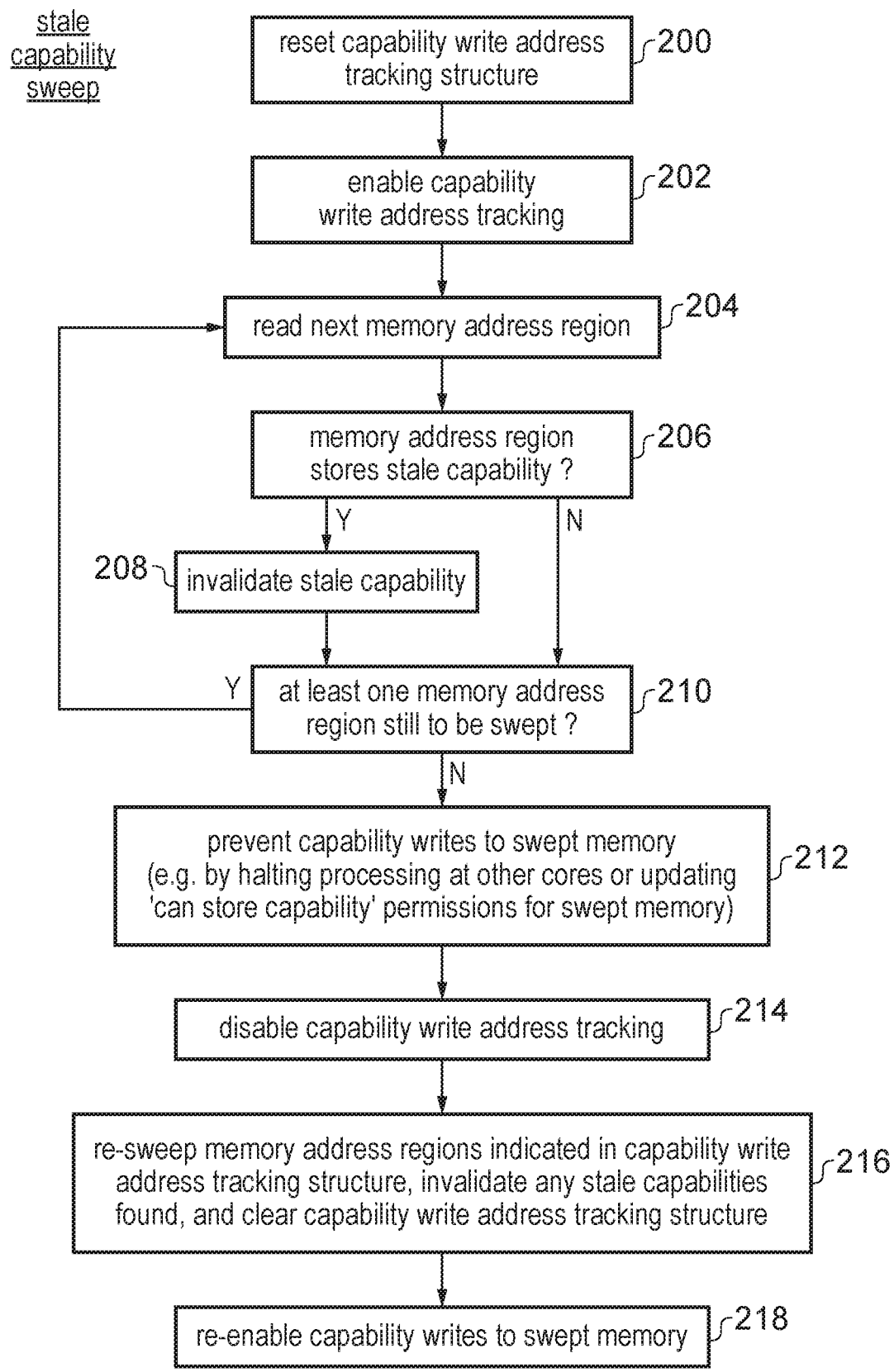
FIG. 6 is a flow diagram showing steps performed by software executing on the multi-processor system to perform a sweep of memory for stale capabilities.

FIG. 6 shows a flow diagram showing a method of performing sweeps for stale capabilities, using the capability write address tracking structure 100 of the type discussed above. The method shown in FIG. 6 shows steps carried out by software which is responsible for performing the sweeps of memory for finding stale capabilities. The method of FIG. 6 does not show the operations which hardware would be performing in the background, such as the updating of the capability write address tracking structure 100 in response to capability write requests detected from the various processor cores 4.

At step 200, optionally the capability sweeping software may reset the capability write address tracking structure 100, for example by clearing all the addresses from the capability write address tracking structure 100 and all the dirty bits within the TLB or other cache used to mark pages which have been subject to capability write operations. The resetting operation may not be needed if it can be guaranteed that the capability write address tracking structure is already clear, for example if software always clears the capability write address tracking structure 100 after using it. Also the reset in step 200 may not be needed if the software has just allocated a brand new capability write address tracking structure 100 and so will be the first to use that tracking structure (in implementations where the capability write address tracking structure is a region of memory which may have been cleared as a result of allocating it).

At step 202 the sweeping software executes an instruction to set the enable register 102 to enable capability write address tracking by the capability write address tracking circuitry 20. Hence, now the capability write address tracking circuitry 20 will start marking entries in the TLB 52 as dirty when it detects a capability write operation performed on the corresponding page, and writes addresses of any such dirty pages to the capability write address tracking structure 100 (or alternatively, updates an imprecise representation of the addresses of the pages subject to capability writes, for example using a Bloom filter as discussed above). This capability write address tracking will continue in the background while the sweep is ongoing.

At step 204 the sweep of the memory address space to find stale capabilities begins. At step 204 the next memory address region to be swept is read by the sweeping software and when the contents of that memory address region becomes available then at step 206 the software checks whether the read address region stores a stale capability. Here a capability is considered to be stale if its valid tag 82 is set, and the range information 76, 78 specified for the capability overlaps with any of one or more memory address regions which are specified in a revocation list of address regions subject to revocation. This revocation list may have been updated as regions of memory are deallocated by an operating system, but the sweep for stale capabilities may be deferred until there are a sufficient number of regions listed, to avoid incurring the performance cost of the sweep every time an address region is deallocated. If the read memory address region stores a stale capability, then at step 208 the stale capability is invalidated by clearing its tag value 82. Step 208 is omitted if the read memory address region did not store any stale capability. At step 210 the software checks whether there is at least one more memory address region that is still to be swept and if so then the method returns to step 204 to loop through steps 204 to 210 until eventually all the required memory address regions have been swept.

Once there are no more memory address regions to be swept, then the method proceeds to step 212. As there is a risk that other threads or processor cores could have written capabilities to the memory address regions previously swept, after the sweeping process has already checked those regions to check whether they store any stale capabilities, then there is a risk that the memory address space could still include some stale capabilities, and so a selective re-sweeping is performed to check the address regions indicated by the capability write address tracking structure 100 for stale capabilities. However, to ensure that further capability writes are not performed during the re-sweep, at step 212 before performing the re-sweep, the sweeping software takes action to make it not possible for capability write operations to be performed on the re-swept memory. This can be done in different ways. One example can simply be to use the "stop the world" approach where all processing at other cores is halted. However, while the "stop the world" approach does have a performance impact, as this is only being used during the re-sweeping of the small number of memory address regions indicated in the capability write address tracking structure 100, this will have much lower performance impact than if the world had been stopped during the entire main sweeping loop from steps 204 to 210. Alternatively, rather than halting processing at other cores, the software could update memory permissions for the swept memory address space to indicate that they cannot be used to store capabilities, temporarily while re-sweeping.

At step 214, the sweeping process also disables the capability write address tracking by clearing the enable register 102, as it is no longer necessary to track capability write operations.

At step 216 the sweeping software then re-sweeps any memory address regions indicated in the capability write address tracking structure 100 and invalidates any stale capabilities found in those regions. It will be appreciated that step 216 may itself include a loop similar to steps 204 to 210 performed for the main sweeping operation, but the loop will typically need to iterate for many fewer iterations than the main loop because it only checks selected regions as indicated in the capability write address tracking structure 100. Once a given region has been re-swept then the corresponding part of the capability write address tracking structure may be cleared, in the example where a dirty page buffer is used as discussed above. In the case of a Bloom filter or other imprecise representation, then the re-sweeping may cover any addresses which generate a hit when querying the filter representation for that address, which could include some false positive addresses which were not actually subject to capability write operations during the period when the capability write address tracking was performed, but nevertheless are re-swept because their addresses alias against patterns of bits within the filter representation that were set as a result of capability write operations to other addresses.

Once the re-sweeping process 216 has finished, then at step 218 the sweeping software can re-enable capability write operations to the swept memory, for example by resuming processing at other processor cores or by updating the "can store capability" permission to once more allow capabilities to be stored in the swept memory regions.

Step 212 is optional and an alternative approach would be that rather than preventing capability writes during the re-sweeping of memory, the capability write address tracking could remain enabled during the re-sweep and then multiple iterations of the re-sweeping process 216 can be performed until a time when no additional addresses were recorded within the capability write address tracking structure 100 before the re-sweeping was complete.

If, during performing of either the main sweep or the re-sweep when capability write address tracking in enabled, the capability write address tracking structure 100 reaches or exceeds the maximum capacity specified by the limit register 110, then an exception may be triggered. An exception handler may then respond to that exception in different ways. Either the exception handler could update the metadata registers 104 and allocate additional memory space for the tracking structure 100, or the exception handler could simply cause the sweeping process of FIG. 6 to be resumed again from the start, in the hope that next time fewer capability write operations may occur during the sweeping process.

Hence, in summary, by providing the capability write address tracking circuitry 20 in hardware for maintaining tracking information which can identify selected addresses which were subject to capability write operations, this means that sweeping software does not need to stop the world during the main sweep of the entire memory address space, which can greatly improve performance.

Figure 7:
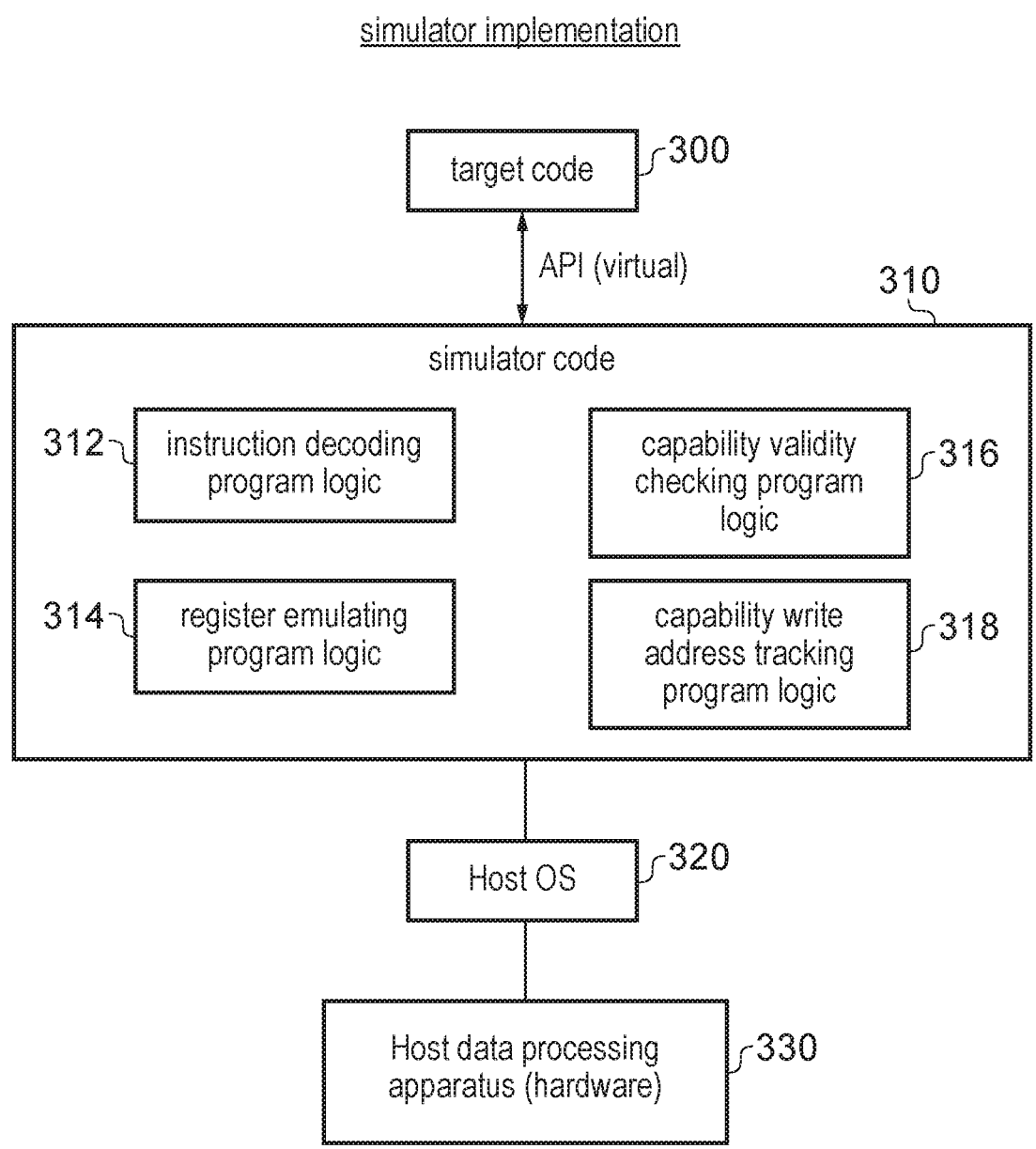
FIG. 7 shows a simulator implementation that may be used.

FIG. 7 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the application program interface of the hardware architecture being modelled by the simulator program 310. Thus, the program instructions of the target code 300, including instructions interacting with capabilities as described above, may be executed from within the instruction execution environment using the simulator program 310, so that a host computer 330 which does not actually have the hardware features of the apparatus 2 discussed above can emulate these features.

The simulator code 310 may include instruction decoding program logic 312 which decodes program instructions of the target code 300 and maps them to corresponding sets of instructions defined in the native instruction set of the host processor 330. Also, the simulator code 310 may include register emulating program logic 314 which manages data structures in the memory of the host hardware which emulate the registers 38, 102, 104 of the target architecture being simulated. Also, capability validity checking program logic 316 may be provided which emulates the capability checking circuitry 86 described above, to perform a check of whether a requested use of a capability is allowed given its range 76, 78 and permissions 80. Also, capability write address tracking program logic 318 may be provided which, when tracking is enabled, detects writes of capabilities to memory and maintains the capability write tracking structure to provide an indication of which pages have been subject to capability writes. Hence, the simulator code 310 may present to the target code architectural features equivalent to those of the hardware-implemented example described earlier, so that again the target code may perform sweeping for stale capabilities in the same way on the host data processing apparatus (which may not itself have capability write address tracking circuitry) as if the target code was executing on an apparatus which does have the capability write address tracking circuitry 20.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   capability checking circuitry to perform a capability checking operation to determine whether use of a capability satisfies one or more use-limiting conditions, the capability comprising a pointer and pointer-use-limiting information specifying the one or more use-limiting conditions, the one or more use-limiting conditions comprising at least an allowable range of addresses for the pointer; and capability write address tracking circuitry, responsive to a capability write request requesting that a capability is written to a memory location associated with a capability write target address, when capability write address tracking is enabled, to update a capability write address tracking structure based on the capability write target address, wherein the capability write address tracking structure is accessible to software defined according to an instruction set architecture supporting use of capabilities to associate pointers with the pointer-use-limiting information.

2. The apparatus according to claim 1, comprising an enable storage element to store a capability write address tracking enable indication indicative of whether the capability write address tracking is enabled or disabled.

3. The apparatus according to claim 2, in which in response to the capability write request, when the capability write address tracking enable indication indicates that capability write address tracking is disabled, the capability write address tracking circuitry is configured to omit updating the capability write address tracking structure based on the capability write target address of the capability write request.

4. The apparatus according to claim 2, comprising processing circuitry to execute program instructions; and
the capability write address tracking enable indication is updatable by the processing circuitry in response to a program instruction executed by the processing circuitry.

5. The apparatus according to claim 1, comprising a cache structure comprising a plurality of entries, each entry to store cached information associated with a corresponding memory address region; and
in response to the capability write request, when the capability write address tracking structure is updated based on the capability write target address, the capability write address tracking circuitry is configured to set a capability-written indicator in an entry of the cache structure corresponding to a memory address region including the capability write target address.

6. The apparatus according to claim 5, in which in response to the capability write request, when capability write address tracking is enabled and the capability write target address corresponds to a memory address region for which a corresponding cache entry already has the capability-written indicator set, the capability write address tracking circuitry is configured to omit updating the capability write address tracking structure based on the capability write target address.

7. The apparatus according to claim 5, in which the cache structure comprises an address translation cache to store address translation information derived from a page table structure in memory.

8. The apparatus according to claim 7, in which on evicting from the address translation cache an entry having the capability-written indicator set, the address translation cache is configured to discard the capability-written indicator without writing the capability-written indicator back to the page table structure in memory.

9. The apparatus according to claim 1, comprising processing circuitry to process instructions from one of a plurality of software processes, each software process associated with a corresponding execution context identifier; and
when capability write address tracking is enabled, the capability write address tracking circuitry is configured to maintain execution context identifier tracking information for tracking one or more execution context identifiers associated with one or more capability write requests.

10. The apparatus according to claim 1, comprising processing circuitry to execute program instructions;
in which in response to a capability write address tracking reset instruction, the processing circuitry is configured to reset the capability write address tracking structure.

11. The apparatus according to claim 1, in which the capability write address tracking structure comprises one of:
a storage unit provided in hardware separate from memory; and
a data structure stored in memory.

12. The apparatus according to claim 1, in which the capability write address tracking structure comprises a data structure stored in memory; and
the apparatus comprises at least one tracking metadata storage element to store at least one of:
a base address of the capability write address tracking structure;
an indication of a next entry of the capability write address tracking structure to be updated; and
a limit indication indicative of a maximum permitted size for the capability write address tracking structure.

13. The apparatus according to claim 1, in which the capability write address tracking structure precisely tracks one or more capability write target addresses of one or more capability write requests received when capability write address tracking is enabled.

14. The apparatus according to claim 1, in which the capability write address tracking structure imprecisely tracks one or more capability write target addresses of one or more capability write requests received when capability write address tracking is enabled, so that querying of the capability write address tracking structure may allow an address other than said one or more capability write target addresses to be falsely identified as being one of said one or more capability write target addresses.

15. The apparatus according to claim 1, in which in response to detecting that the capability write address tracking structure has reached a capacity limit, the capability write address tracking circuitry is configured to trigger signalling of an exception.

16. The apparatus according to claim 1, comprising a plurality of processor cores; and
the capability write address tracking structure is shared between the plurality of processor cores.

17. A method comprising:
performing a capability checking operation to determine whether use of a capability satisfies one or more use-limiting conditions, the capability comprising a pointer and pointer-use-limiting information specifying the one or more use-limiting conditions, the one or more use-limiting conditions comprising at least an allowable range of addresses for the pointer; and
receiving a capability write request requesting that a capability is written to a memory location associated with a capability write target address; and
updating a capability write address tracking structure based on the capability write target address,
wherein the capability write address tracking structure is accessible to software defined according to an instruction set architecture supporting use of capabilities to associate pointers with the pointer-use-limiting information.

18. A non-transitory, computer-readable storage medium storing a computer program for controlling a host data processing apparatus to provide an instruction execution environment for executing target code, the computer program comprising:
  capability checking program logic to perform a capability checking operation to check whether use of a capability satisfies one or more use-limiting conditions, the capability comprising a pointer and pointer-use-limiting information specifying the one or more use-limiting conditions, the one or more use-limiting conditions comprising at least an allowable range of addresses for the pointer; and
  capability write address tracking program logic, responsive to a capability write request requesting that a capability is written to a memory location associated with a capability write target address, when capability write address tracking is enabled, to update a capability write address tracking structure based on the capability write target address,
  wherein the capability write address tracking structure is accessible to the target code.

19. A method comprising:
  enabling capability write address tracking by a capability write address tracking structure for tracking capability write target addresses of one or more capability write requests, where a capability write request comprises a request to write a capability to a memory location associated with a capability write target address specified by the capability write request, and the capability comprises a pointer and pointer-use-limiting information specifying one or more use-limiting conditions including at least an allowable range of addresses for the pointer;
  sweeping memory to invalidate stale capabilities, the stale capabilities comprising capabilities for which the allowable range of addresses overlaps with one or more target regions of addresses; and
  after sweeping the memory, re-sweeping one or more selected memory address regions corresponding to addresses tracked by the capability write address tracking structure, to invalidate stale capabilities stored in the one or more selected memory address regions.

20. A non-transitory, computer-readable storage medium storing a computer program for controlling a data processing apparatus to perform the method of claim 19.

* * * * *